Sept. 18, 1951 H. A. ROBINSON 2,568,412

AUTOMATIC WIDE RANGE ELECTRICAL WAVE GENERATOR OF HIGH STABILITY

Filed March 13, 1948 2 Sheets-Sheet 1

INVENTOR
HARRIS A. ROBINSON
BY Harry Tunick
ATTORNEY

INVENTOR
HARRIS A. ROBINSON
BY
ATTORNEY

UNITED STATES PATENT OFFICE 2,568,412

AUTOMATIC WIDE RANGE ELECTRICAL WAVE GENERATOR OF HIGH STABILITY

Harris A. Robinson, Philadelphia, Pa., assignor to Radio Corporation of America, a corporation of Delaware Application March 13, 1948, Serial No. 14,666

4 Claims. (Cl. 250—36)

In this application, I disclose improved means for generating oscillatory energy of high stability, approaching that of a crystal controlled oscillator. The frequency of the generated oscillatory energy may be readily changed continuously as desired through a wide frequency range. My apparatus as disclosed is substantially wholly automatic, requiring only manual operation of a crystal selector and one other tuner, the rest of the control apparatus being automatically operated by forces set in motion when the crystal selection is made. This manual operation requires merely selection of the frequency at which it is desired to operate.

Automatic tuners for generating oscillations covering a wide range of frequencies are known but are not of high stability. Also, automatic tuners of limited range and high stability are known.

The general purpose of my invention is to provide an improved means for generating wave energy the frequency of which is continuously changeable through a very wide frequency range. My means is very stable in operation at any selected discrete frequency in said range. Heretofore, means for this purpose required the use and availability of large groups of specific frequency crystals for use in the generator, these crystals usually being selected manually.

A further purpose of my invention is to provide means as described in the preceding paragraph which requires a very small number of crystals which per se are not necessarily ground to frequencies equal to or harmonically related to the desired selected frequencies. For example, in a typical application to a superheterodyne receiver, a group of nine crystals permits selection of any discrete frequency in a spectrum of two to twenty-five megacycles. In this application, the fundamental range of the oscillator is from 2.7 to 4.1 megacycles and the range has been extended by the use of harmonic multipliers.

Known systems for generating a large number of stabilized waves require availability of separate crystals ground to each frequency which might possibly be desired in operation of the equipment. The disadvantages of such a system are apparent. For example, in military application, various missions require frequent change of frequencies and an unlimited number of available frequencies. An advantage of my system is that as stated above, a relatively small number of small crystals are needed and they are included as an integral part of the equipment.

The invention is obviously of wide use in the radio art, since it may be used in any application wherein there is need of generated oscillations of stable frequency, the frequency of which may be selected as desired through a very wide band of frequencies. In the typical application used to describe my invention, the generated waves are used as heterodyning oscillations in a superheterodyne receiver and as exciting oscillations in a transmitter. The invention is not limited to such use.

Figure 1:
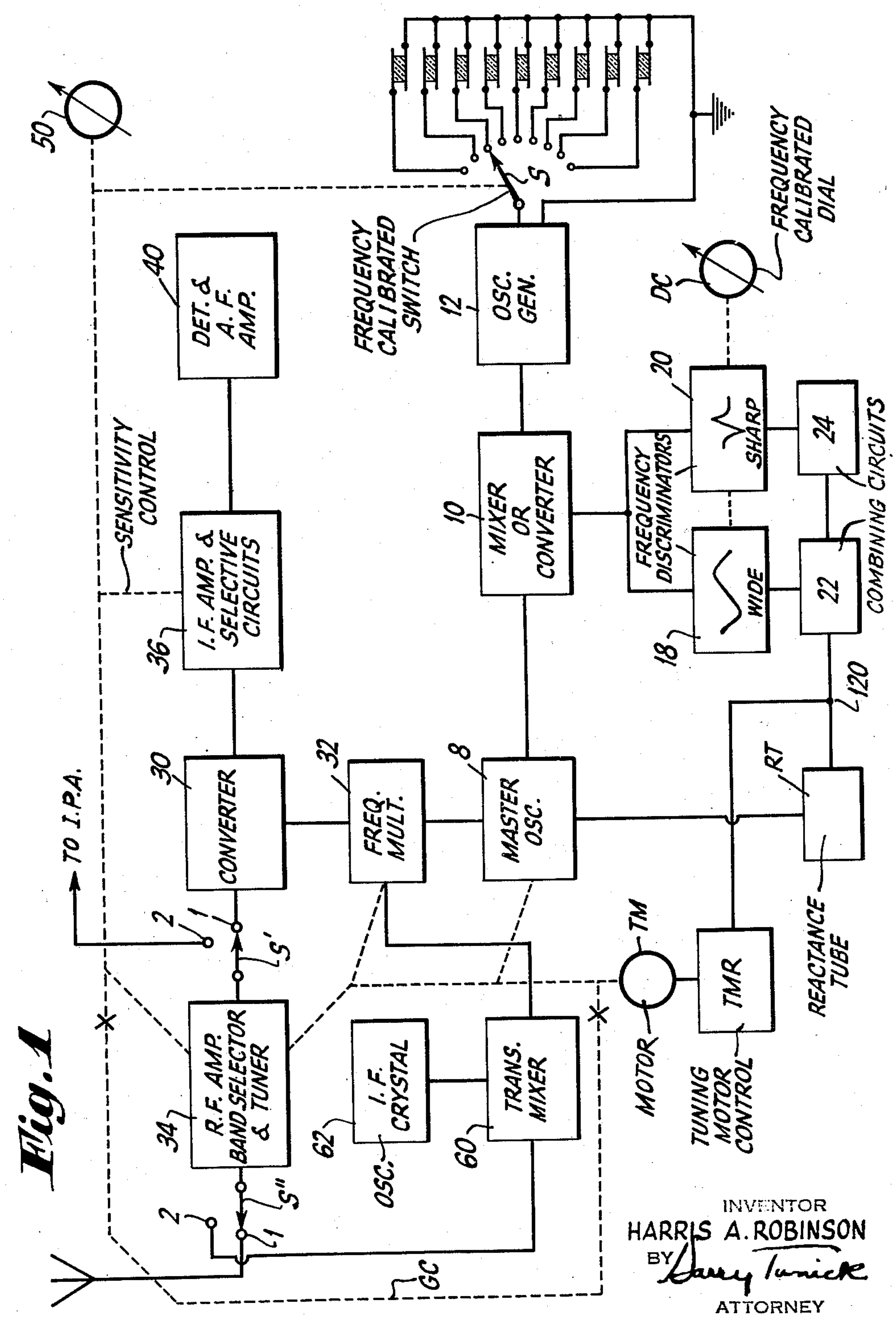

In describing my invention in detail, reference will be made to the attached drawings wherein, Fig. 1 illustrates by rectangle and line connection the essential features of a wave generating system arranged in accordance with my invention. This figure also includes apparatus for putting to use a selected wave as generated.

Figures 2, 3:
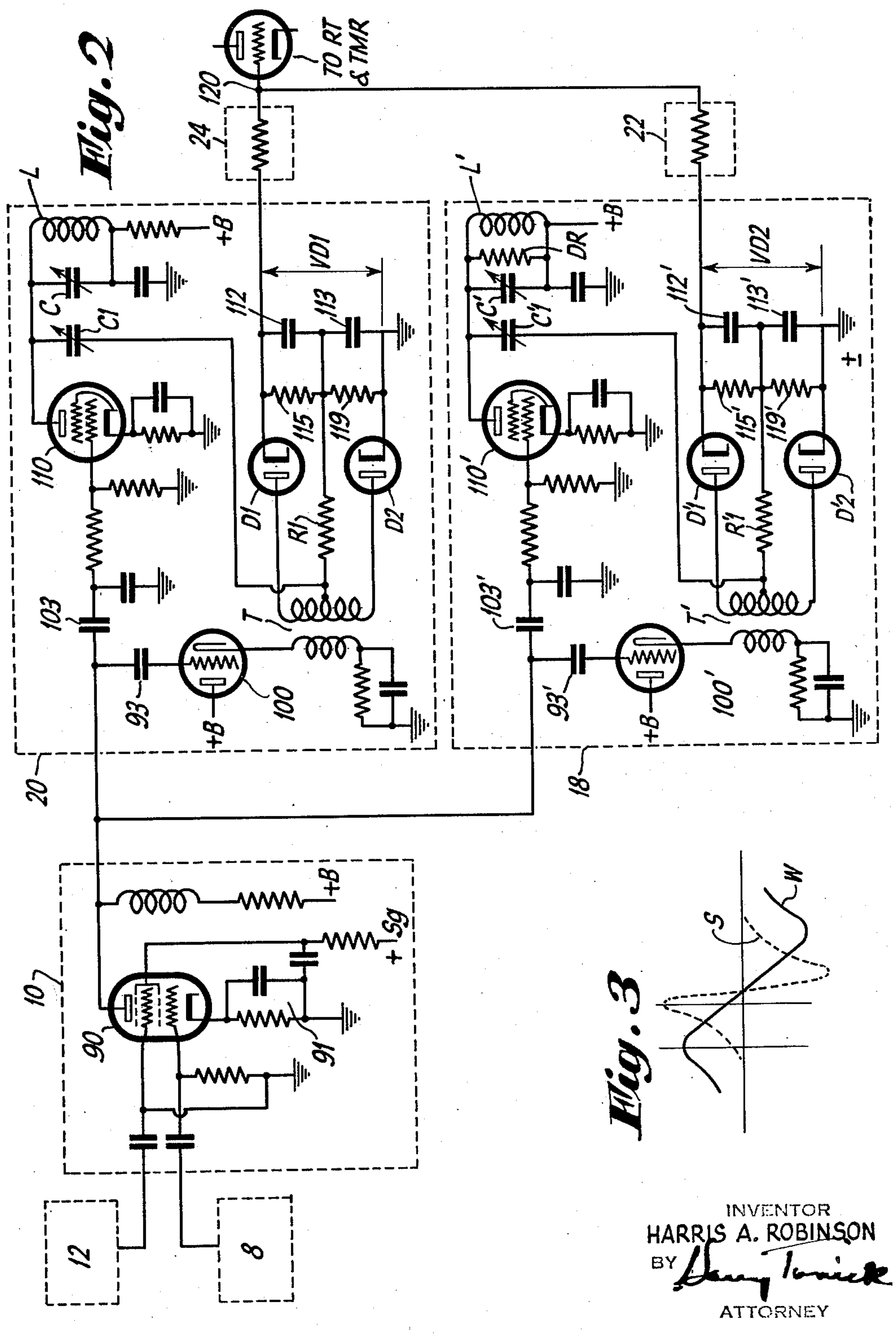

Fig. 2 illustrates by circuit element and circuit element connection the essential elements of the wide and sharp discriminator circuits 18 and 20 of Fig. 1 and their connection to the mixer 10 and to the reactance tube RT and tuning motor drive of Fig. 1, while Fig. 3 illustrates the characteristics of the sharp and wide discriminator circuits 18 and 20 of Fig. 1.

In its broadest aspect, my invention involves as illustrated in Fig. 1 a master oscillator 8 of extended tuning range, say for example, tunable over a range from 2.7 to 4.1 megacycles. This oscillator may be conventional in many respects but is to include tuning means appropriate to readily permit tuning thereof over said range by either manual or automatic adjustment. In automatic tuning, said tuning operation is carried out by a tuning motor TM which also perform other functions in the system, as will be described hereinafter. A highly stable source of oscillatory energy 12 is also provided to supply oscillatory energy to the mixer 10 for beating purposes. The source 12 is arranged to operate at several substantially uniformly spaced frequencies. The source 12 may comprise an electron discharge tube generator and in the example taken for illustration, nine crystals. A selected one of the crystals is included in the oscillation generating circuits by switch S to control its frequency of operation. These crystals are integral with the generating apparatus and are, except for the I. F. generator described hereinafter, the only crystals used in the apparatus. The source 12 may comprise a lesser number of crystals, say for example, one and means for developing and selecting harmonics of the stabilized oscillations and feeding them to the mixer 10. The frequency spacing between the harmonics or between adjacent crystals of the group as shown in Fig. 1 is small enough to be within the tuning range of the discriminators referred to hereinafter.

The oscillatory energies from source 8 and from source 12 are mixed in converter 10 and the difference frequency selected and fed to two frequency discriminators 18 and 20. One of these discriminators, for example 18, has a wide characteristic as shown by the curve labeled W in Fig. 3. In other words, this discriminator characteristic is represented by a curve of slow or gradual slope. The other discriminator 20 is sharp, having a characteristic as illustrated by the curve S, Fig. 3, whose slope rises at an accelerated rate with respect to the slope of the wide band discriminator. A single discriminator with an appropriate characteristic may replace the wide and sharp discriminators shown here. These discriminators are tunable by a control means DC shown schematically, and the range of tuning covers the interval between adjacent crystals of the reference source 12. This tuning range covers a band 100 kc. wide, extending from 400 to 500 kc. in the example being given. This tunable discriminator is a feature of my invention, as will appear hereinafter. The control DC for these discriminators is manual and is one of the two manual controls used for selecting any one of the large number of frequencies made available. The discriminators may be conventional and may be of the type disclosed in Seeley U. S. Patent #2,121,103 or in Conrad U. S. Patent #2,057,640 or modifications thereof. In Fig. 2, I illustrate a preferred form of discriminator which is disclosed and claimed in detail in my U. S. application Serial No. 101,079, filed June 24, 1949.

Each discriminator output includes a direct current component, the absolute magnitude of which depends on the frequency of the difference frequency fed from mixer 10 to the discriminators. These outputs are additively combined (in series or in parallel) in units 22 and 24 and fed to a reactance tube RT and to a tuning motor control TMR. The reactance tube may be conventional being, for example, substantially as described in Crosby Patent #2,279,659 dated April 14, 1942 and is included as a reactance in the master oscillation generator 8 in all positions of tuning thereof. The tuning motor control TMR controls the direction of rotation of tuning motor TM which tunes the oscillator 8 and related equipment. The tuning motor may comprise two field windings and a rotor which rotates in one direction when one field winding is excited and in the other direction when the other field winding is excited. Then the potential at 120 controls switching means for exciting one or the other winding depending on the absolute magnitude of the potential at 120. This switching means may comprise a pair of tubes with output relays operating in opposed sense to control the position of an armature which in turn completes the field winding circuits. Accurate or exact tuning may be said to be carried out by the reactance tube RT and rough tuning is carried out by the motor TM. Moreover, the latter provides the feature of automatic tuning.

Returning now to the discriminators 18 and 20, the same are tunable over a frequency range sufficient to cover the frequency intervals between adjacent crystals that may be switched into the oscillator circuit at 12 or between adjacent harmonics when a single crystal (or smaller group) is employed. This is an important feature of my invention, since by this means I am able to generate wave energy of stable frequency and to readily change the frequency of the wave energy to any desired frequency through a wide range of frequencies and to do so with a small number of crystals.

In describing the operation, it will be assumed that the oscillators, mixers, automatic frequency system and so forth are in operation and I am going to change the frequency of operation. The appropriate crystal (determined by the desired frequency) is selected at 12 by moving the switch S to include the same in the oscillation generating circuit. The discriminator tuning is also adjusted to be appropriate for the difference frequency resulting from mixing the selected crystal output (or equivalent harmonic) with output from the master oscillator 8. The dials or scales on switch S of 12 together with the discriminator tuning control DC make this selection of the desired frequency direct reading, being calibrated to denote the master oscillator frequency. To assure that the master oscillator will be near the selected frequency a tuning adjustment of 8 is usually necessary to bring the master oscillator to a frequency such that the difference frequency out of the mixer 10 will be within the frequency range of the discriminator response characteristic. This tuning adjustment may be either manual or automatic. The automatic tuning is accomplished by the tuning motor TM. In this typical arrangement, the motor drives the master oscillator 8 and associated tuning controls to a reference position (low frequency end of the oscillator tuning range) during the period while the frequency selection controls S and DC are being set. Upon completion of the setting of these controls, the tuning motor TM tunes the master oscillator 8 (and associated equipment) through the frequency band—scanning the band—until the difference frequency passes through the range of response of the discriminators 18 and 20, these discriminators then taking over the final control of the tuning. During this operation, the broad discriminator characteristic is effective first to operate through the reactance tube RT and motor TM to tune the master oscillator 8 toward the proper frequency and when the difference frequency out of 10 is brought within the range of the sharp discriminator 20, the tuning action is accentuated to bring master oscillator 8 to the desired frequency setting.

When the master oscillator 8 serves as the heterodyning oscillator in the receiver and/or an exciter for a transmitter, the arrangement may be somewhat like that disclosed in my U. S. Patent #2,419,593, dated April 29, 1947. The additional apparatus necessary to put said oscillations to use may be as indicated in Fig. 1. Then the master oscillator 8 supplies output to the receiver converter 30. Converter 30, R. F. amplifier 34, I. F. amplifier 36 and detector-audio amplifier 40 may be conventional elements of a normal superheterodyne receiver such as are well known in the art. If the frequency range is to be extended as in the usual multi-band receiver-transmitter, a frequency multiplier 32 may be interposed between the master oscillator 8 and the converter 30. In this typical example, the receiver has six bands a selected one of which may be switched in by control 50 which also actuates switch S. There are inductors and trimmer condensers for each band in the R. F. amplifier stages 34, frequency multiplier 32 and input circuits of the converter 30. The control 50 when switching bands, also determines the required frequency multiplier ($N=1, 2, 3, 4, 6$) and may switch selective I. F., circuits in 36 for several band widths as desired when operating at higher frequencies. To simplify the description, the tuning sequence in one band only has been discussed. The radio frequency amplifier 34 and frequency multiplier 32 are tunable over each frequency band by a suitable tuning means ganged with the master oscillator 8. As previously described, these ganged circuits may be automatically tuned by the motor TM. The intermediate frequency amplifier 36 is fixed in tuning but includes a selectivity or band width control which is actuated by the control 50.

If the apparatus is to include a transmitter as well as a receiver and the same is to operate on the same frequency used by the receiver, the output of the frequency multiplier 32 is also coupled to a transmitter mixer 60 which is excited by an intermediate frequency oscillator 62 of stable frequency such as a crystal controlled oscillator. Since the oscillator 62 operates at the frequency of the intermediate frequency amplifier 36, all that is necessary is to select the desired sum or difference frequency from the mixer 60 to derive the transmitter oscillatory energy at the frequency being received. In the embodiment described, the radio frequency amplifier 34 is used as a pre-amplifier for the transmitter exciter in which case the switch S'' is moved to the number two position as is the switch S' so that the oscillatory energy of the desired frequency, selected as described hereinbefore, is amplified at 34 and fed to intermediate power amplifier stages in a transmitter for exciting the same. The arrangement in this respect is quite like the arrangement disclosed in my U. S. Patent #2,419,593, dated April 29, 1947.

In Fig. 2, I have shown one form of the discriminators which may be used at 18 and 20 of Fig. 1. This figure also includes tube 90, which is in the mixer stage 10. This tube 90 has its first and third grids coupled respectively to the sources 8 and 12. These grids are biased in a conventional manner by being connected to ground by resistors to complete biasing circuits through the cathode resistor and condenser unit 91 to the cathode. The anode of this tube is coupled by coupling condenser 93 to the control grid of a tube 100, the cathode of which is in series with the primary winding of an untuned coupling transformer T feeding corresponding electrodes of diode rectifiers D1 and D2. The anode of this tube 90 is also coupled by condenser 103 to the control grid of an amplifier stage tube 110. This control grid is biased in a conventional manner by a grid resistor connecting the grid to ground and a cathode resistor and condenser unit connecting the cathode to ground. The anode of tube 100 is coupled to a tuned circuit comprising capacitor C and inductor L and the potential developed across this tuned circuit is fed by condenser C1 to the mid point of the secondary winding of the broad untuned coupling transformer T. A resistor R1 connects this point to the bypass capacitors 112, 113. C1 R1 forms a phase shifter network. In operation, the response of transformer T is substantially uniform with frequency but the circuit LC is frequency responsive and the difference frequency voltage developed shifts in phase as the frequency changes near the resonance of LC. This frequency dependent voltage is shifted in phase a fixed amount by C1 R1 and fed in parallel relation to the diode D1 and D2 electrodes so that the voltages on the diodes are the resultants of these last voltages and the push-pull voltage applied at T. Then the differential detector output voltage VD1 varies as the I. F. frequency changes in general as in said Seeley patent.

The damping of the circuit LC determines the width of the discriminator characteristic and since the tubes and circuit described are designated as being in the sharp discriminator 20, LC is left undamped. The anode of tube 90 is also coupled to the wide discriminator 18 and this discriminator is similar in nearly all respects to the discriminator 20. To the elements of this discriminator 20, I have applied numerals corresponding to the numerals or letters used in describing the elements in the discriminator 20, but have primed said numerals or letters. In the discriminator 18, a damping resistor DR is connected in shunt to the tuned circuit LC and the impedance of this resistance determines the damping of the circuit and the effective width of the discriminator. The discriminator 20 might then have a characteristic as illustrated at S in Fig. 3 while the discriminator 18 has a characteristic as illustrated at W in Fig. 3. The detectors in the discriminator 20 have their cathodes connected by resistors 115 and 119. The resistors are shunted by capacitors 112 and 113 which bypass any intermediate frequency energy reaching the detectors and also fix the time of the circuits so that the potentials developed thereacross follow only slow changes in the frequency of the intermediate frequency out of the mixer 10. A point on resistor 119 is grounded so that the voltage VD1 at the ungrounded end varies plus to minus and vice versa as the frequency shifts through the cross over point of the discriminator characteristic. The diodes D'1 and D'2 are similarly connected and operated. The potential drops across the resistors 115, 119 and 115', 119' may be fed in series or in parallel to terminal 120 from which they are supplied to the reactance tube RT and to a control tube in the motor tuning control unit TMR. Tuning takes place as long as a potential of material magnitude is developed at point 120, and this potential is of a sign to tune the oscillator 8 in a direction to reduce the potential at 120 to zero.

By tuning the circuit LC, I cause the crossover points of discriminators 18 and 20 to vary through the desired tuning range. In this application, the tuning range is 400 to 500 kc, so that on selection of any one of the frequencies (spaced every 100 kc.) by selection of a crystal at 12, setting of the control dial DC will tune the discriminators 18 and 20. Only when the difference frequency out of mixer 10 falls at the crossover point, is the potential at 120 zero, and the automatic tuning operation is complete. Then the oscillator 8 will be generating oscillations of the desired frequency selected and said frequency may be read directly off the dials for S and the control DC. Assume, for example, energy is to be generated at oscillation generator 8 to be used in the receiver tuned to a wave of 2.11 megacycles. The switch S and control 50 are operated together and set to the 100 kc. marking nearest the desired frequency (2.1 mc. in this example). S selects a crystal operating at 3.3 mc. When the control was operated, the motor tuner first tuned the circuits in 34 and in 8 to the low frequency reference end of the band. The frequency of I. F. amplifier 36 is assumed to be 0.7 megacycle so that to get this I. F. the oscillator 8 must operate at 2.81 mc. when the R. F. is at 2.11 mc. as assumed above. The dial DC is then adjusted to read 10 kc. which tunes the discriminators 18 and 20 so the crossover points of their characteristics are at 490 kc. When the setting of this control is complete, the tuning of the master oscillator 8 is adjusted manually or automatically as previously described. As the oscillator 8 approaches 2.81 mc. the difference frequency out of mixer 10 sweeps into the response characteristics of the discriminators 18 and 20 and potential is developed at 120 to operate through the motor TM and reactance tube RT to tune the master oscillator 8 to bring the potential at 120 to zero and then the oscillator 8 will be operating at the frequency set by control 50 (S) and by DC. This automatic tuning may be extended to the band switching elements connected to dial 50, in which case the control 50 and controls operated by the motor TM are ganged as indicated by dotted line GC. It will be obvious that even if the discriminator response is inaccurate, say $\frac{1}{10}$ of one percent of the I. F. (it can be more accurate) the error is a very small percentage of the master oscillator frequency. Thus, for each crystal setting at S, I provide output of substantially constant frequency at any frequency in a 100 kc. segment and by selection of another crystal any frequency in another 100 kc. segment, etc.

The useful frequency range of the controlled master oscillator may be extended by employing a frequency multiplier (harmonic generator) at 32 before the excitation is injected into the converter 30 or transmitter mixer 60. The order of harmonic developed in 32 is determined by the band switch operated through control 50.

What is claimed is:

1. In apparatus for generating oscillatory energy of substantially stable frequency, the frequency of which may be changed at will continuously through a wide range of frequencies, an oscillation generator of controllable frequency, an oscillation source of substantially fixed frequency, a frequency converter directly coupled to both the oscillation generator and to said source to be excited by oscillations therefrom, narrow and wide band frequency discriminators, both turnable at will through a frequency range starting at a frequency of the order of a side band frequency, coupled to said frequency converter to both be excited by side band energy therefrom, and a control circuit coupling said discriminators to said oscillation generator to control the frequency of operation thereof.

2. In apparatus for generating oscillatory energy of stable frequency, the frequency of which may be changed at will through a wide range, an oscillation generator of controllable frequency, a source of oscillations operative at a selected one of a plurality of substantially fixed frequencies separated each frequency from the other by substantially equal frequency intervals, a frequency converter directly coupled to said oscillation generator and to said source, frequency control apparatus for said oscillation generator, a frequency discriminator apparatus tunable at will through a frequency range substantially equal to said frequency intervals and including the frequency of the lower sideband produced in said converter, means coupling said discriminator apparatus, to said frequency converter, and a coupling between said frequency discriminator apparatus and said frequency control apparatus, the means used to select the desired one of the plurality of fixed frequencies having suitable indicia thereon and the means used to tune the tunable discriminator having suitable indicia thereon, whereby the frequency to which the oscillation generator is controlled may be accurately determined from such indicia.

3. In apparatus for generating oscillatory energy of stable frequency, the frequency of which may be changed at will through a wide range, an oscillation generator of controllable frequency, a source of oscillations operative at a selected one of a plurality of substantially fixed frequencies separated each frequency from the other by substantially equal frequency intervals, a frequency converter directly coupled to said oscillation generator and to said source, frequency control apparatus for said oscillation generator, a frequency discriminator apparatus tunable at will through a frequency range substantially equal to said frequency intervals and including the frequency of the lower sideband produced in said converter, said discriminator apparatus including both wide and narrow band frequency discriminator circuits, means coupling said discriminator apparatus to said frequency converter, and a coupling between said frequency discriminator apparatus and said frequency control apparatus.

4. In apparatus for generating oscillatory energy of stable frequency, the frequency of which may be changed at will through a wide range, an oscillation generator of controllable frequency, a source of oscillations operative at a selected one of a plurality of substantially fixed frequencies separated each frequency from the other by substantially equal frequency intervals, a frequency converter directly coupled to said oscillation generator and to said source, frequency control apparatus for said oscillation generator, a frequency discriminator apparatus tunable at will through a frequency range substantially equal to said frequency intervals and including the frequency of the lower sideband produced in said converter, means coupling said discriminator apparatus to said frequency converter, and a coupling between said frequency discriminator apparatus and said frequency control apparatus, said frequency control apparatus including a reactance tube in the oscillation generator circuit and a motor for driving a tunable element in said circuit, said reactance tube and said motor being utilized to automatically tune said generator to approximately the desired frequency as selected by the means used to select the desired one of the plurality of fixed frequencies and by the means used to tune the tunable discriminator.

HARRIS A. ROBINSON.

REFERENCES CITED

The following references are of record in the file of this patent:

UNITED STATES PATENTS

| Number | Name | Date |
|---|---|---|
| Re. 22,587 | Varian et al. | Jan. 2, 1945 |
| 2,404,852 | Koch | July 30, 1946 |
| 2,410,817 | Ginzton et al. | Nov. 12, 1946 |
| 2,425,922 | Crosby | Aug. 19, 1947 |
| 2,521,070 | Lindner | Sept. 5, 1950 |